(12) United States Patent
Fleddermann et al.

(10) Patent No.: US 8,256,718 B2
(45) Date of Patent: Sep. 4, 2012

(54) METHOD AND DEVICE FOR PROVIDING AUTOMATIC LOAD ALLEVIATION TO A HIGH LIFT SURFACE SYSTEM, IN PARTICULAR TO A LANDING FLAP SYSTEM, OF AN AIRCRAFT

(75) Inventors: Andreas Fleddermann, Bremen (DE); Wolfgang Hartwig, Delmenhorst (DE); Alexandre Darbois, Toulouse (FR); Martin Richter, Bremen (DE)

(73) Assignee: Airbus Operations GmbH (DE)

( * ) Notice: Subject to any disclaimer, the term of this patent is extended or adjusted under 35 U.S.C. 154(b) by 578 days.

(21) Appl. No.: 12/086,467

(22) PCT Filed: Dec. 8, 2006

(86) PCT No.: PCT/EP2006/011867
§ 371 (c)(1),
(2), (4) Date: Oct. 27, 2009

(87) PCT Pub. No.: WO2007/068413
PCT Pub. Date: Jun. 21, 2007

(65) Prior Publication Data
US 2011/0084173 A9 Apr. 14, 2011

(30) Foreign Application Priority Data
Dec. 13, 2005 (DE) .......................... 10 2005 059 369

(51) Int. Cl.
*B64C 13/00* (2006.01)
*G05D 1/00* (2006.01)

(52) U.S. Cl. ...................................... 244/194; 244/99.9

(58) Field of Classification Search .......... 244/193–196, 244/224, 227, 228, 99.2, 99.9, 76 A, 213
See application file for complete search history.

(56) References Cited

U.S. PATENT DOCUMENTS

| | | | |
|---|---|---|---|
| 4,256,277 A | 3/1981 | Embree | |
| 4,260,121 A | 4/1981 | Baston et al. | |
| 4,355,358 A * | 10/1982 | Clelford et al. | 244/195 |
| 4,971,267 A | 11/1990 | Fulton et al. | |
| 6,224,022 B1 | 5/2001 | Barba | |
| 6,237,465 B1 * | 5/2001 | Forster et al. | 92/71 |
| 6,419,606 B1 * | 7/2002 | Tengan et al. | 475/5 |

(Continued)

FOREIGN PATENT DOCUMENTS
CN 1396876 A 2/2003

(Continued)

*Primary Examiner* — Tien Dinh
*Assistant Examiner* — Richard R Green
(74) *Attorney, Agent, or Firm* — Lerner, David, Littenberg, Krumholz & Mentlik, LLP

(57) ABSTRACT

A method and a device for providing automatic load alleviation to a high lift surface system, in particular to a landing flap system, of an aircraft when a blockage occurs, wherein in response to a control signal emitted by a control device at least one high lift surface, which is actuated by means of a local mechanical final control element, is brought to a predetermined position by a central drive unit that is connected by way of a rotary shaft arrangement to the local final control element by generating a torque transmitted by the central drive unit to the rotary shaft arrangement. If a signal is registered that indicates that there is a blockage within the high lift surface system, the torque transmitted by the central drive unit to the rotary shaft arrangement is automatically reduced to a predetermined low torque value, and the position of the high lift surface system is fixed.

20 Claims, 2 Drawing Sheets

U.S. PATENT DOCUMENTS

Figure 1:
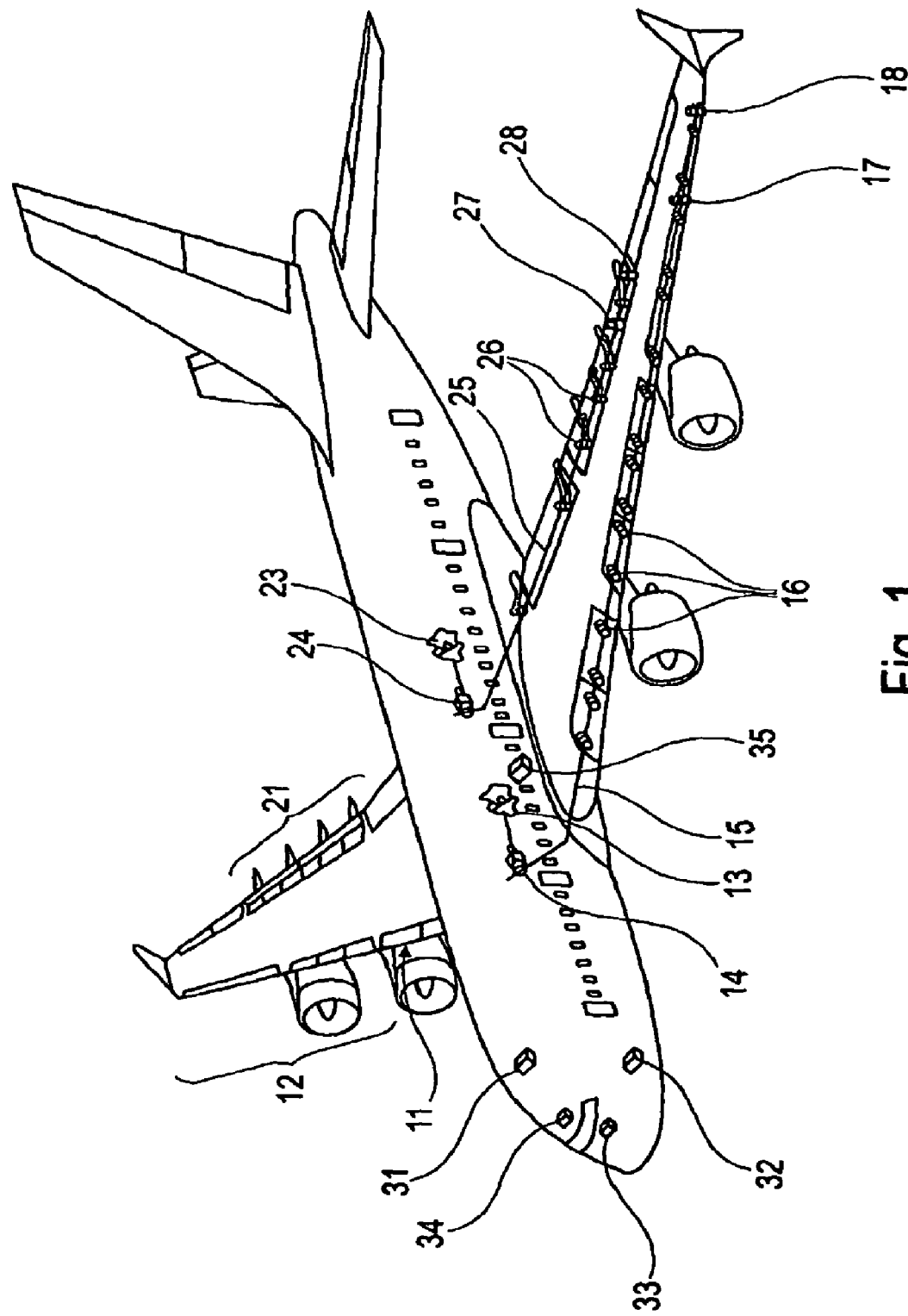

| | | |
|---|---|---|
| 8,074,937 B2 * | 12/2011 | Carl et al. ............ 244/194 |
| 2002/0193063 A1 | 12/2002 | Scheerer et al. |
| 2003/0127569 A1 | 7/2003 | Bacon et al. |
| 2004/0200677 A1 * | 10/2004 | Mayer et al. ............ 188/134 |
| 2007/0080261 A1 | 4/2007 | Neumann et al. |
| 2009/0212977 A1 | 8/2009 | Pohl |

FOREIGN PATENT DOCUMENTS

| | | |
|---|---|---|
| CN | 101321666 A | 12/2008 |
| DE | 103 53 672 A1 | 6/2005 |
| EP | 1 038 765 A1 | 9/2000 |
| EP | 1 310 848 A1 | 5/2003 |
| GB | 1 591 799 | 6/1981 |
| JP | 48-040199 | 6/1973 |
| JP | 53-085098 | 7/1978 |
| JP | 60-146928 | 8/1985 |
| JP | 04-503196 | 6/1992 |
| JP | 2004291957 A | 4/2007 |
| JP | 2007510584 A | 4/2007 |
| RU | 2000250 C1 | 9/1993 |
| RU | 2068798 C1 | 11/1996 |
| RU | 2071440 C1 | 1/1997 |
| SU | 671180 A1 | 1/1984 |
| WO | 2005/047108 A1 | 3/2005 |
| WO | WO 2005047108 A1 * | 5/2005 |

* cited by examiner

1) Extending

2) Retracting

METHOD AND DEVICE FOR PROVIDING AUTOMATIC LOAD ALLEVIATION TO A HIGH LIFT SURFACE SYSTEM, IN PARTICULAR TO A LANDING FLAP SYSTEM, OF AN AIRCRAFT

This application claims benefit of the German patent application No. 10 2005 059 369.0, filed Dec. 13, 2005 the content of which is hereby incorporated herein by reference.

FIELD OF THE INVENTION

The present invention relates to a method and a device for providing automatic load alleviation to a high lift surface system, in particular to a landing flap system, of an aircraft.

BACKGROUND ART

High lift surface systems of aircraft are used to increase lift during takeoff or landing; they typically comprise landing flaps, leading-edge flaps or wing regions with a continuously variable profile or similar arrangements by means of which the wing profile can be changed and/or enlarged with a view to augmenting lift. In many civil aircraft and also in military transport aircraft such high lift surfaces are driven by a central drive unit that is connected, by way of a rotary shaft arrangement that typically extends in the spanwise direction, to local mechanical final control elements provided on the high lift surfaces. The local final control elements can comprise spindles or crank mechanisms or similar actuation devices. In most cases several such high lift surfaces are arranged along the rotary shaft arrangement. Typically a first such rotary shaft arrangement extends along the front region of the wing profile, thus serving to actuate leading-edge flaps provided in this location, while a second rotary shaft arrangement extends along the rear region of the wing, thus serving to drive the landing flaps provided in this location. If during extension or retraction of the high lift surfaces a blockage occurs within the rotary shaft arrangement or within the final control elements associated with the high lift surfaces, between the location of the blockage and the drive unit the rotary shaft arrangement is subjected to torsional stress by the drive motor until the stall torque has been reached. This results in substantial torsional loads that according to the state of the art until now could only be reduced after the end of the flight and after carrying out corresponding repair work. Until repairs can be effected, the rotary shaft system remains in the stressed state, loaded with the maximum motor moment. As a result of the substantial torsional moment of the stressed shaft arrangement in the case of a blockage, the rotary shaft system is thus subjected to very considerable mechanical stress between the drive motor and the location of the blockage, which mechanical stress is still further increased if in addition bending moments and tensile-/compressive loads are introduced into the rotary shaft system as a result of wing bending, landing shocks or the like. The individual elements of the rotary shaft system have to be dimensioned to provide the corresponding strength, with the safety factors—which have been calculated taking into account the possibility of extended times under load—limiting the options of optimising the weight of the shafts.

SUMMARY OF THE INVENTION

There may be a need to provide a method and a device for providing automatic load alleviation to a high lift surface system, in particular to a landing flap system, of an aircraft, by means of which method and device in the case of a blockage the rotary shaft arrangement contained in the high lift surface system is relieved of unnecessarily high torsional loads.

This need may be met, for example, by a method and a device with the characteristics of the respective independent claims.

Advantageous embodiments of the method and the device of the present invention are disclosed in the respective subordinate claims.

The invention may create a method for providing automatic load alleviation to a high lift surface system, in particular to a landing flap system, of an aircraft when a blockage occurs, in which method in response to a control signal emitted by a control device at least one high lift surface, which is actuated by means of a local mechanical final control element, is brought to a predetermined position by a central drive unit that is connected by way of a rotary shaft arrangement to the local final control element by means of generating a torque transmitted by the central drive unit to the rotary shaft arrangement. According to the invention, if a signal is registered that indicates that there is a blockage within the high lift surface system, the torque transmitted by the central drive unit to the rotary shaft arrangement is automatically reduced to a predetermined lower torque value, and the position of the high lift surface system is fixed.

The signal that indicates a blockage can be derived from registering a signal that represents a predetermined high torque value in relation to the torque transmitted by the central drive unit to the rotary shaft arrangement for a predetermined period of time.

As an alternative, the signal that indicates that there is a blockage can be derived from registering a signal which represents a predetermined high torque value for the torque transmitted by the central drive unit to the rotary shaft arrangement in conjunction with the occurrence of a control signal caused by the pilot to the effect of initiating a reversal in the direction of rotation of the rotary shaft arrangement.

According to a preferred embodiment of the invention, the signal that indicates a blockage can be derived from a comparison of signals emitted by position sensors provided in the high lift surface system, which signals represent the actual position of the high lift surfaces, with signals predetermined by an evaluation algorithm carried out in the control device, which signals represent the command position of the high lift surfaces. In this process, advantageously the signals that represent the actual position of the high lift surfaces can be obtained by asymmetry position sensors that have been provided on the ends of the rotary shaft arrangements. The occurrence of the maximum pivoting-disc angle of a hydraulic axial piston motor in swash plate design can be registered as a signal that represents the predetermined high torque value.

As an alternative, the occurrence of the maximum motor current of an electric motor contained in the central drive unit can be registered as the signal that represents the predetermined high torque value.

The predetermined low torque value relating to the torque transmitted by the central drive unit to the rotary shaft arrangement, at which torque the position of the high lift surface system is fixed, is preferably set such that the high lift surfaces are secured against any uncontrolled retraction due to external air loads.

The predetermined low torque value is preferably set such that it is below the trigger value of a torque limiter that is contained in the rotary shaft arrangement of the high lift surface system.

According to a preferred embodiment of the method according to the invention, fixing the position of the high lift surface system takes place by activating a motor locking brake contained in the central drive unit.

According to a preferred embodiment of the method according to the invention, after registering the signal that indicates that there is a blockage, a request is issued to the pilot to issue a control signal that causes a reversal in the direction of rotation of the rotary shaft arrangement.

Furthermore, the invention creates a device for providing automatic load alleviation to a high lift surface system, in particular to a landing flap system, of an aircraft when a blockage occurs, in which device in response to a control signal emitted by a control device at least one high lift surface, which is actuated by means of a local mechanical final control element, is adjustable by a central drive unit that is connected by way of a rotary shaft arrangement to the local final control element by means of generating a torque transmitted by the central drive unit to the rotary shaft arrangement.

According to the invention the control device is provided, in cases where a signal is registered that indicates that there is a blockage within the high lift surface system, to emit a signal to the central drive unit, which signal automatically reduces the torque transmitted by the central drive unit to the rotary shaft arrangement to a predetermined low torque value, and to emit a signal to a braking device, which signal fixes the position of the high lift surface system.

According to an embodiment of the invention, the control device is provided for evaluating a signal that indicates a blockage, which signal has been registered for a predetermined period of time, and represents a predetermined high torque value in relation to the torque transmitted by the central drive unit to the rotary shaft arrangement.

According to another exemplary embodiment of the invention, the control device is provided for evaluating a signal that indicates a blockage, which signal represents a predetermined high torque value in relation to the torque transmitted by the central drive unit to the rotary shaft arrangement in conjunction with an occurrence of a control signal caused by the pilot to the effect of initiating a reversal in the direction of rotation of the rotary shaft arrangement.

According to a preferred embodiment of the invention, the control device is provided for deriving the signal that indicates that there is a blockage by a comparison of signals emitted by position sensors provided in the high lift surface system, which signals represent the actual positions of the high lift surfaces, with signals predetermined by an evaluation algorithm carried out in the control device, which signals represent the command position of the high lift surfaces.

In this process, preferably the signals that represent the actual position of the high lift surfaces are taken from asymmetry position sensors that have been provided on the ends of the rotary shaft arrangements.

Registering the occurrence of the maximum pivoting-disc angle of a hydraulic inclined-axis motor contained in the central drive unit can be provided as the signal that represents the predetermined high torque value.

Furthermore, registering the occurrence of the maximum motor current of an electric motor contained in the central drive unit can be provided as the signal that represents the predetermined high torque value.

Preferably, the predetermined low torque value relating to the torque transmitted by the central drive unit to the rotary shaft arrangement, at which torque the position of the high lift surface system is fixed, is set such that the high lift surfaces are secured against any uncontrolled retraction due to external air loads.

Preferably, the predetermined low torque value is set such that it is below the triggering value of a torque limiter that is contained in the rotary shaft arrangement of the high lift surface system.

According to a preferred embodiment of the invention, a motor locking brake contained in the central drive unit is provided for fixing the position of the high lift surface system.

According to a preferred embodiment of the invention, the control device is provided, after registering the signal that indicates that there is a blockage, to emit to the pilot a request to issue a control signal that causes a reversal in the direction of rotation of the rotary shaft arrangement.

Below, an exemplary embodiment of the invention is described with reference to the drawing.

Figure 2A:
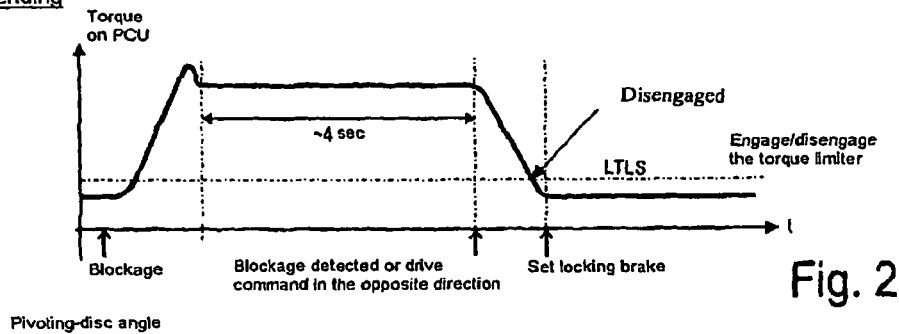
Figure 3A:
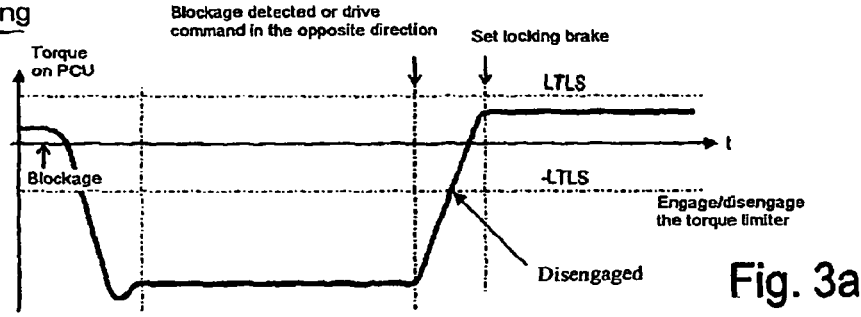
Figure 3B:
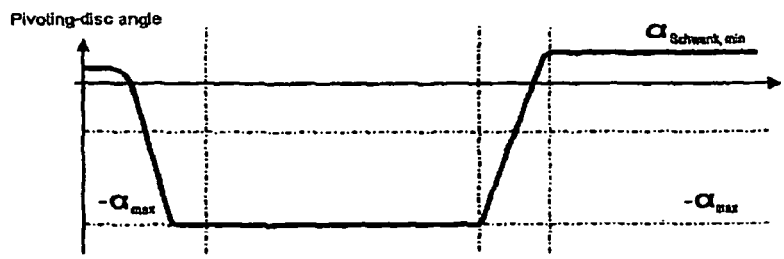

The following are shown:

FIG. 1 a perspective view of an aircraft, in which a high lift surface system in the form of a leading-edge flap system arranged on the wing leading edge, and a landing flap system arranged on the wing trailing edge are provided, according to an exemplary embodiment of the invention;

FIG. 2a) and b) diagrams that show the time gradient of the torque of a central drive unit provided in the high lift surface system, or of the pivoting-disc angle of a hydraulic inclined-axis motor provided in such a central drive unit in the case of a blockage when extending the high lift surface system with torsion load alleviation according to the exemplary embodiment of the invention; and FIG. 3a) and b) diagrams that show the time gradient of the torque of a central drive unit provided in the high lift surface system, or of the pivoting-disc angle of a hydraulic inclined-axis motor provided in such a central drive unit in the case of a blockage when retracting the high lift surface system with torsion load alleviation according to the exemplary embodiment of the invention.

FIG. 1 is a perspective view of a civil aircraft of modern design, in which aircraft a high lift surface system according to one exemplary embodiment of the invention has been implemented. The high lift surface system comprises leading-edge flaps 11, 12 arranged on the wing leading edge, and landing flaps 21 arranged on the wing trailing edge.

For actuating the leading-edge flaps 11, 12 a front rotary shaft arrangement 15 has been provided, which is arranged along the wing leading edge so as to extend essentially in the direction of the wingspan; while for actuating the landing flaps 21 a rear rotary shaft arrangement 25 is provided, which is provided on the wing trailing edge so as to also extend essentially in the direction of the wingspan. For each of the two wings of the aircraft such a front rotary shaft arrangement 15 and such a rear rotary shaft arrangement 25, respectively, are provided, of which FIG. 1 shows only the rotary shaft arrangements 15, 25 of one wing. The front rotary shaft arrangements of both wings are jointly driven, by way of a T-gear arrangement 14, by a central drive unit 13; while the rear rotary shaft arrangements 25 of both wings are driven in the same manner, by way of a T-gear arrangement 24, by a central drive unit 23. In the embodiment described the central drive unit 13 of the front rotary shaft arrangements 15, which central drive unit 13 is provided for driving the leading-edge flaps, comprises a hydraulic inclined-axis motor and an electronically controlled electric motor to provide driving force, which motors are not specifically shown in the figure. Motor control electronics 35 are provided for controlling the electric motor. The central drive unit 23 of the rear rotary shaft arrangements 25, which rear rotary shaft arrangements 25 are provided for actuating the landing flaps 21, comprises two hydraulic inclined-axis motors, which are also not specifically shown in the figure. By means of the central drive units 13, 23 the rotary shaft arrangements 15, 25 are rotated in one direction or in the other direction by way of the respective T-gear arrangements 14, 24 for extending or retracting the high lift flaps, i.e. the leading-edge flaps 11, 12 and the landing flaps 21.

On the high lift surfaces, local mechanical final control elements are provided, namely on the leading-edge flaps 11, 12 local mechanical final control elements 16, and on the landing flaps 21 local mechanical final control elements 26, which convert said rotary movement of the rotary shaft arrangements 15, 25 to an extension movement or to a retraction movement of said high lift surfaces. These local final control elements 16, 26 can, for example, be spindles or crank mechanisms.

Near the ends of the rotary shaft arrangements 15, 25, so-called wingtip brakes 17 or 27 are provided, which are used to fix the position of the respective rotary shaft arrangement on the drive side in the last-assumed position in the case of a failure, which case is unlikely but cannot be ruled out altogether, so that uncontrolled retraction of the high lift surfaces due to the air loads that are present is prevented.

Finally, at the end of the rotary shaft arrangements 15, 25 respective asymmetry position sensors 18, 28 are provided, which when the rotary positions of the wingtip ends of the rotary shaft arrangements 15 of both wings deviate from each other emit a corresponding signal; with the same also applying to the rotary shaft arrangements 25 of both wings.

Control of the central drive units 13, 23 and thus of the leading-edge flaps 11, 12 or landing flaps 21 driven by said central drive units 13, 23 takes place by way of a control device 31, 32 in the form of flap control computers. Entering an operating command to the control device 31, 32 is effected by the pilot, for example, by way of a flap actuation lever 33.

Furthermore, each of the central drive units 13, 23 comprises a locking brake, not specifically shown in the figure, by means of which locking brake the position, at the particular time, of the respective power control unit 13, 23 can be fixed. Furthermore, when viewed in the drive direction, at the front end of each rotary shaft arrangement 15, 25, a mechanical torque limiter is arranged, by means of which the very high torque generated by the respective central drive unit 13, 23 is limited to a value that is tolerable in relation to the respective rotary shaft arrangement 15, 25.

The hydraulic inclined-axis motors contained in the central drive units 13, 23 comprise a variable regulated pivoting disc, by means of which the motor moment $M_{mot}$ is set proportionally in relation to the set pivoting-disc angle $\alpha_{schwenk}$. Furthermore, in the central drive unit 13 the regulated electric motor that has already been mentioned above is provided, in which there is proportionality of the motor moment in relation to the commanded current $i_{soll}$. In the case of a blockage in the rotary shaft system, i.e. in one of the rotary shaft arrangements 15, 25, the motor moment increases from a stationary operative value to the maximum stall torque. In the case of the hydraulic motor, the reason for the aforementioned is the rise, due to regulation, of the pivoting-disc angle up to the maximum value $\alpha_{schwenk, max}$, or in the case of the electric motor a corresponding rise, due to regulation, of the commanded current $i_{soll}$ to a maximum value $i_{soll, max}$. In response to respective control signals emitted by the control device 31, 32, and by generating a torque that is transmitted by the central drive unit 13, 23 to the rotary shaft arrangement 15, 25, the high lift surface system that is formed by the leading-edge flaps 11, 12 or by the landing flaps 21, respectively, is brought to a desired predefined position.

When a blockage within the high lift surface system is registered, the torque produced by the central drive unit 13, 23 is automatically reduced to a predetermined low torque value, and the high lift surface system is fixed in its position. Such a blockage can predominantly occur within the rotary shaft arrangement 15, 25 or within the local final control elements 16, 26 provided on the high lift surfaces 11, 12, 21, and would result in the shaft system being subjected to torsional stress between the position of the blockage and the drive motor of the central drive unit 13, 23 until the stall torque has been reached. Without load alleviation this would have the disadvantageous effects described in the introduction.

The present invention makes use of the components and sensors present in the high lift surface system in order to bring about such load reduction in the case of a blockage.

In the exemplary embodiment presently described, a signal that indicates that there is a blockage is derived from a comparison of signals that represent the actual position of the high lift surfaces 11, 12, 21, which signals are emitted by position sensors present in the high lift surface system, in the present exemplary embodiment by asymmetry position sensors 18, 28 provided at the end of the rotary shaft arrangements, with signals that represent the command position of the high lift surfaces 11, 12, 21, which signals are predetermined by an evaluation algorithm carried out in the control device 31, 32.

As an alternative, the signal that indicates a blockage can be derived from registering a signal that is present for a predetermined period of time and represents a predetermined high torque value in relation to the torque transmitted by the central drive unit 13, 23 to the rotary shaft arrangement 15, 25, which torque only occurs to this extent in the case of a blockage.

Furthermore, such a signal can be derived from registering a signal that represents a predetermined high torque value, as can only occur in the case of a blockage, in conjunction with the occurrence of a control signal caused by the pilot to the effect of initiating a reversal in the direction of rotation of the rotary shaft arrangement 15, 25. This is the case when the occurrence of a blockage in the high lift surface system is immediately detected by the pilot, and when the pilot initiates corresponding counteraction. The signal which represents a high torque value that indicates that there is a blockage can be derived from the maximum pivoting-disc angle $\alpha_{schwenk, max}$ in the case of a hydraulic inclined-axis motor, or by the maximum commanded current $i_{soll, max}$ in the case of an electric motor.

The control device 31, 32 is provided, after registering the signal that indicates that there is a blockage, to emit a request to the pilot to issue a control signal that causes a reversal in the direction of rotation of the rotary shaft arrangement 15, 25. The predetermined low torque value to which the torque in the rotary shaft arrangement 15, 25 is subsequently returned and at which the position of the high lift surface system is subsequently fixed is set such that on the one hand the torque is below the triggering value of the torque limiter that is contained in the rotary shaft arrangement 15, 25, and that on the other hand the high lift surfaces 11, 12, 21 are secured against any uncontrolled retraction due to external air loads. In the exemplary embodiment described fixing the position of the high lift surface system takes place by activating the motor locking brakes contained in the central drive unit 13, 23.

FIGS. 2a) and b) show the time gradient of the torque on the central drive unit (PCU) 13, 23, i.e. the torque transmitted by the central drive unit 13, 23 to the rotary shaft arrangement 15, 25 by way of the T-gear arrangement 14, 24, as well as the pivoting-disc angle $\alpha_{schwenk}$ of the hydraulic inclined-axis motor provided in the central drive unit 13, 23. When a blockage occurs at the point in time indicated in FIG. 2a) by the arrow, the torque rises to a maximum value, which is caused by an increase in the pivoting-disc angle $\alpha_{schwenk}$ to the maximum value $\alpha_{max}$. After a predefined period of time, in the present example 4 seconds, the blockage is deemed to have been detected and a corresponding counter-drive command is issued by the central control unit 13, 23. As an alternative, at this point in time a command to drive in the opposite direction could also have been issued by the pilot. Within a short subsequent time slot the pivoting-disc angle is regulated back in a controlled manner from the maximum value $\alpha_{max}$ to the predetermined low value $\alpha_{schwenk, min}$, and in this way proportionally the motor moment and the torsion moment acting in the rotary shaft arrangement 15, 25 are reduced. This reduced torsion moment is below the threshold LTLS that is shown in FIG. 2a) by a dot-dash line, which line corresponds to engaging/disengaging the already described torque limiter. As already explained above, the minimum pivoting-disc angle $\alpha_{schwenk, min}$ is designed such that on the one hand the mechanical torque limiter (provided there is one) is disengaged again, and on the other hand it is ensured that an adequate moment against the external air loads is present. As soon as the minimum pivoting-disc angle has been reached, the motor locking brake (which typically is present as standard) is activated. The load alleviation process is thus complete, and the torsional moment in the rotary shaft arrangement 15, 25 is reduced to the desired minimum, and from this moment level a new start can be made with the objective of clearing the blockage.

Figure 2B:
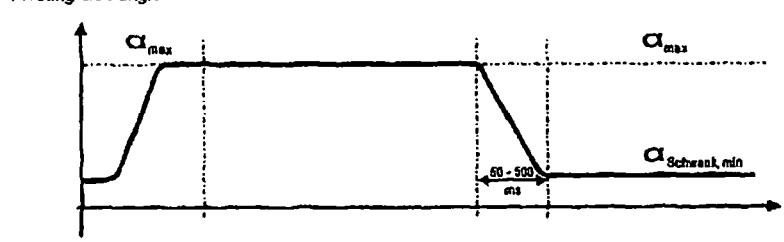

FIGS. 3a) and b) are corresponding diagrams that show the torque gradient and the pivoting-disc angle in a case where during retraction of the high lift surfaces a blockage occurs. At the point in time marked by an arrow in FIG. 3a a blockage occurs so that the torque of the central drive unit 13, 23 in the direction of the retraction movement increases to its maximum value, which is due to an increase in the pivoting-disc angle of the hydraulic inclined-axis motor to the value $\alpha_{max}$. Again after a certain period of time, 4 seconds, as in FIG. 2, the blockage is deemed to have been detected, or the pilot issues a command to drive in the opposite direction. Within a short time slot the pivoting-disc angle is reduced from its maximum value $\alpha_{max}$, and after the zero crossing, said pivoting-disc angle is regulated back to the predefined low minimum value $\alpha_{schwenk, min}$. This minimum value in turn is dimensioned such that it is below the threshold LTLS for engaging/disengaging the torque limiter and acts against the external air loads so that uncontrolled retraction of the high lift surfaces is reliably prevented. At this minimum pivoting-disc angle $\alpha_{schwenk, min}$ the motor locking brake is subsequently activated again. The load alleviation procedure is thus terminated, the torsional moment in the rotary shaft arrangement 15, 25 is reduced to a minimum, and from this low torque level a new start can be made in order to clear the blockage.

As a result of the alleviation, according to the invention, of the load acting on the rotary shaft, in all cases where a blockage occurs the high torsional moment experienced in the rotary shaft system is reduced to a safe minimum after a short period of time. Consequently the load is alleviated from all the mechanical components that are involved. This is advantageous in particular if the blockage is permanently present and if even after repeated attempts to drive the central drive motor in the opposite direction it is not possible to free the system up. Load alleviation makes it possible to achieve weight optimisation within the rotary shaft system while maintaining the best possible safety.

LIST OF REFERENCE CHARACTERS

11 Leading-edge flaps
12 Leading-edge flaps
21 Landing flaps
13, 23 Central drive unit
14, 24 T-gear arrangement
15, 25 Rotary shaft arrangement
16, 26 Local final control element
17, 27 Wingtip brake
18, 28 Asymmetry position sensor
31, 32 Control device
33 Flap actuation lever
34 Reset device
35 Motor control electronics

The invention claimed is:

1. A method for providing automatic load alleviation to a landing flap system of an aircraft when a blockage occurs, comprising:
   in response to a first control signal emitted by a control device bringing at least one high lift surface, which is actuated by means of a local mechanical final control element, to a predetermined position by a central drive unit that is connected by way of a rotary shaft arrangement to the local final control element by generating a torque transmitted by the central drive unit to the rotary shaft arrangement, and
   wherein, if a first signal is registered that indicates that there is a blockage within the high lift surface system, automatically reducing the torque transmitted by the central drive unit to the rotary shaft arrangement to a predetermined low torque value, and fixing the position of the high lift surface system;
   wherein the first signal that indicates a blockage is derived from registering a second signal which represents a predetermined high torque value in relation to the torque transmitted by the central drive unit to the rotary shaft arrangement in conjunction with an occurrence of a second control signal caused by the pilot to the effect of initiating a reversal in the direction of rotation of the rotary shaft arrangement.

2. The method of claim 1, wherein the first signal that indicates a blockage is derived from registering a third signal that represents a predetermined high torque value in relation to the torque transmitted by the central drive unit to the rotary shaft arrangement for a predetermined period of time.

3. The method of claim 2, wherein the occurrence of the maximum pivoting-disc angle of a hydraulic inclined-axis motor contained in the central drive unit is registered as the third signal that represents the predetermined high torque value.

4. The method of claim 2, wherein the occurrence of the maximum motor current of an electric motor contained in the central drive unit is registered as the third signal that represents the predetermined high torque value.

5. The method of claim 1, wherein the first signal that indicates a blockage is derived from a comparison of a first plurality of signals emitted by position sensors provided in the high lift surface system, which first plurality of signals represents the actual position of the high lift surfaces, with a second plurality of signals predetermined by an evaluation algorithm carried out in the control device, which second plurality of signals represents the command position of the high lift surfaces.

6. The method of claim 5, wherein the first plurality of signals that represents the actual position of the high lift surfaces is obtained by asymmetry position sensors being provided on the ends of the rotary shaft arrangements.

7. The method of claim 1, wherein the predetermined low torque value relating to the torque transmitted by the central drive unit to the rotary shaft arrangement, at which torque the position of the high lift surface system is fixed, is set such that the high lift surfaces are secured against any uncontrolled retraction due to external air loads.

8. The method of claim 1, wherein the predetermined low torque value is set such that it is below the triggering value of a torque limiter that is contained in the rotary shaft arrangement of the high lift surface system.

9. The method of claim 1, wherein fixing the position of the high lift surface system takes place by activating a motor locking brake contained in the central drive unit.

10. The method of claim 1, wherein, after registering the first signal that indicates that there is a blockage, a request is issued to the pilot to issue the second control signal that causes a reversal in the direction of rotation of the rotary shaft arrangement.

11. A device for providing automatic load alleviation to a landing flap system of an aircraft when a blockage occurs, comprising:
    a control device for emitting a first control signal;
    a central drive unit;
    a local mechanical final control element adjustable by the central drive, in response to the control signal, wherein the central drive is connected by way of a rotary shaft arrangement to the final control element; and
    a braking device,
    at least one high lift surface actuated by the local mechanical final control element by a torque transmitted by the central drive unit to the rotary shaft arrangement,
    wherein the control device is configured, when a first signal is registered that indicates that there is a blockage within the high lift surface system, to emit a second signal to the central drive unit, which second signal automatically causes the central drive unit to reduce the torque transmitted by the central drive unit to the rotary shaft arrangement to a predetermined low torque value, and to emit a third signal to the braking device, which third signal fixes the position of the high lift surface system; and
    wherein the control device is configured for evaluating a fourth signal, which represents a predetermined high torque value in relation to the torque transmitted by the central drive unit to the rotary shaft arrangement in conjunction with the occurrence of a second control signal caused by the pilot to the effect of initiating a reversal in the direction of rotation of the rotary shaft arrangement for deriving the signal that indicates a blockage.

12. The device of claim 11, wherein the control device is configured for evaluating a third signal, which has been registered for a predetermined period of time, and represents a predetermined high torque value in relation to the torque transmitted by the central drive unit to the rotary shaft arrangement as the first signal that indicates a blockage.

13. The device of claim 12, wherein registering the occurrence of the maximum pivoting-disc angle of a hydraulic inclined-axis motor contained in the central drive unit is provided as the third signal that represents the predetermined high torque value.

14. The device of claim 12, wherein registering the occurrence of the maximum motor current of an electric motor contained in the central drive unit is provided as the third signal that represents the predetermined high torque value.

15. The device of claim 11, wherein the control device is configured for deriving the first signal that indicates that there is a blockage by a comparison of a first plurality of signals emitted by position sensors provided in the high lift surface system, which first plurality of signals represents the actual position of the high lift surfaces, with a second plurality of signals predetermined by an evaluation algorithm carried out in the control device, which second plurality of signals represents the command position of the high lift surfaces.

16. The device of claim 15, wherein the first plurality of signals that represents the actual position of the high lift surfaces is obtained from asymmetry position sensors being provided on the ends of the rotary shaft arrangements.

17. The device of claim 11, wherein the predetermined low torque value relating to the torque transmitted by the central drive unit to the rotary shaft arrangement, at which torque the position of the high lift surface system is fixed, is set such that the high lift surfaces are secured against any uncontrolled retraction due to external air loads.

18. The device of claim 11, wherein the predetermined low torque value is set such that it is below the triggering value of a torque limiter that is contained in the rotary shaft arrangement of the high lift surface system.

19. The device of claim 11, wherein a motor locking brake contained in the central drive unit is provided for fixing the position of the high lift surface system.

20. The device of claim 11, wherein the control device is configured, after registering the first signal that indicates that there is a blockage, to emit to the pilot a request to issue the second control signal that causes a reversal in the direction of rotation of the rotary shaft arrangement.

* * * * *